G. E. KELLAR.
FLUME GATE.
APPLICATION FILED MAY 4, 1911.

999,457.

Patented Aug. 1, 1911.

Witnesses.

Inventor.
George E. Kellar.
by
Hazard Strause
Attys.

UNITED STATES PATENT OFFICE.

GEORGE E. KELLAR, OF LOS ANGELES, CALIFORNIA, ASSIGNOR TO KELLAR-THOMASON MANUFACTURING COMPANY, OF LOS ANGELES, CALIFORNIA, A CORPORATION OF CALIFORNIA.

FLUME-GATE.

999,457.

Specification of Letters Patent.

Patented Aug. 1, 1911.

Application filed May 4, 1911. Serial No. 624,914.

*To all whom it may concern:*

Be it known that I, GEORGE E. KELLAR, a citizen of the United States, residing at Los Angeles, in the county of Los Angeles and State of California, have invented new and useful Improvements in Flume-Gates, of which the following is a specification.

This invention relates to improvements in flume gates and has particular relation to flume gate mechanisms which are adapted to be employed in connection with irrigating systems and it is an object of the invention to provide a simple and inexpensive and yet effective flume gate mechanism which is well adapted for use in connection with the cement piping, stand pipes, flumes and distributing conduits.

The gate forming the subject matter of the present invention has for its principal object the formation of a gate receiving portion and a tubular conduit or flume engaging portion, the parts being crimped or stamped together by machinery so as to produce a strong and non-leaking joint in a simple and inexpensive manner.

It is also an object of the invention to provide the gate receiving portion with a flange upon which the adjacent tubular portion may be crimped, the said gate receiving portion being formed with a raised bead or gate engaging portion insuring the formation of a tight joint when the gate is closed, in shutting off the flow of water.

Figure 1:
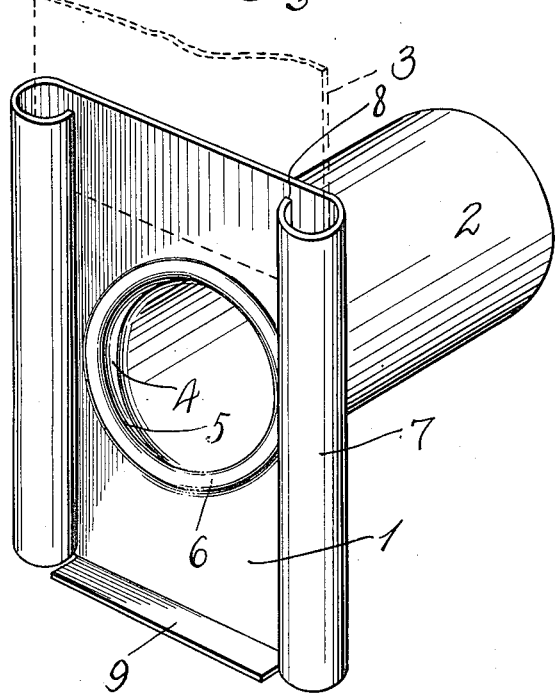
Figure 2:
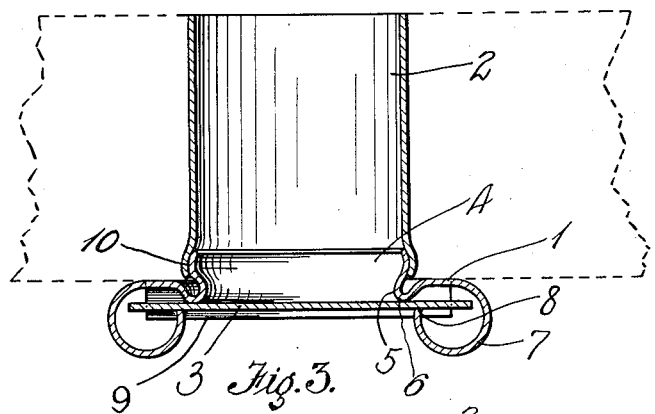
Figure 3:
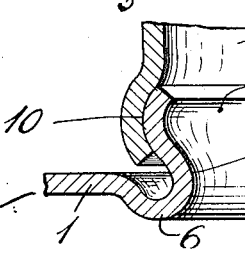

In the accompanying drawing forming a part of this specification; Figure 1 is a perspective view of the flume gate forming the subject matter of the present invention. Fig. 2 is a horizontal transverse sectional view through the flume gate taken longitudinally of the tubular portion thereof. Fig. 3 is an enlarged detail sectional view through the crimped joint or seam formed between the gate receiving portion and the tubular portion of the device.

The details of the invention will now be more particularly described, reference being had to the drawing in which 1 indicates the head or main plate of the flume gate device, and 2 the tubular portion thereof. This gate mechanism is usually provided with a short tubular section 2 which is adapted to be set in the cement of a stand pipe flume, or other conduit portion of an irrigating system.

The tubular portion is designed to be set in the cement of such conduit, so that the plate 1 projects outside and is adapted to receive a gate 3 for controlling or shutting off the flow of water which would otherwise issue from the said tube 2. The plate 1 when made in accordance with the present invention is provided with an inwardly extending flange portion 4 surrounding the outlet opening made in the central portion of the said plate 1. The said flange 4 is preferably connected with the plate 1 proper by means of a rolled or curved portion 5 forming an outwardly projecting bead or raised edge 6, around the opening in the plate 1. The bead or raised edge thus formed is adapted to be engaged by the gate 3, offering a smooth and even bearing entirely around the opening, for insuring the proper closing of the gate against the leakage of water. The edges of the gate are slipped behind resilient rolled flanges 7 having their inner edges 8 arranged to bear upon the gate 3, adjacent to the sides of the circular raised portion 6, so that the resilient flanges 7 will firmly clamp the gate in position under a spring pressure. The plate 1 is provided at the bottom with a limiting flange 9 which prevents the gate from descending too far with respect to the opening to be closed.

The flange 4 is adapted to extend into the end of the tubular part 2 and by means of suitable dies and formers, the lapped edges of the said tube 2 and the said flange 4 are curved and crimped tightly upon each other as clearly indicated at 10 in Figs. 2 and 3. The edge 2 is thus tightly secured to the plate 1 and it is found in practice that a water tight joint can be made between the parts in this simple and effective manner.

The crimped portions of the adjacent parts are preferably arranged sufficiently to one side of the plate 4, to permit of the crimping dies coming together in a proper manner. The joint thus formed between the parts is also so located that it is generally embedded in the cement of the flume, conduit stand-pipe or other irrigating channel so that any tendency to leak at this point would be prevented by the cement as will be clearly understood by inspection of Fig. 2.

It will be evident that the gate is simple in structure and requires no soldering, and can be employed at any points in an irrigating system where the flow of water is to be controlled from flumes, conduits and the like.

What I claim is:

1. A flume gate, comprising a gate receiving portion having a flange projecting beyond one face thereof, and a tubular portion crimped thereon.

2. A flume gate comprising an apertured plate having a flange projecting to one side from the edges of the aperture in said plate and a tubular portion having its edge fitting upon said flange, and crimped tightly thereon for joining the parts.

3. A flume gate comprising a gate holding plate having a central opening, the plate being provided with a projecting rib about said opening and a projecting flange, the said rib portion being adapted to form a water tight joint with a gate, and a tubular portion receiving the said flange and fitting upon the same, to hold the parts together and form a tight joint.

4. A flume gate comprising a gate holding plate having side gate engaging flanges, and a central opening, the metal of the plate being shaped to form a projecting bead or ridge about the said opening and having a curved flange projecting to one side of said opening, and a tubular portion having a correspondingly curved edge fitting upon the said curved flange, the curvature of the parts serving to lock the same together.

In witness that I claim the foregoing I have hereunto subscribed my name this 24th day of April, 1911.

GEO. E. KELLAR.

Witnesses:
EDMUND A. STRAUSE,
EARLE R. POLLARD.